Feb. 24, 1942.　　　T. TINKER　　　2,274,439

PRESSURE VESSEL

Filed July 1, 1939

INVENTOR
Townsend Tinker
BY
John S. Powers
ATTORNEY

Patented Feb. 24, 1942

2,274,439

UNITED STATES PATENT OFFICE 2,274,439

PRESSURE VESSEL

Townsend Tinker, Boston, N. Y., assignor to Ross Heater & Manufacturing Co., Inc., Buffalo, N. Y., a corporation of New York Application July 1, 1939, Serial No. 282,439

2 Claims. (Cl. 285—137)

This invention relates to improvements in pressure vessels, particularly those of the kind wherein one of two associated parts is formed or provided with a flange to which the other is bolted or otherwise secured.

Heretofore, the forming or providing of the flanges upon the vessel parts has been effected in such a manner that when the vessels have been subjected to pressure loads and the flanges have been acted upon by the accompanying twisting forces their deflection has caused distortion of the adjoining portions of the vessel walls. The degree of distortion varies in accordance with the magnitude of deflection of the flanges and unless provision is made to counteract such forces their magnitude may be great enough to cause permanent deformation of the vessel walls. It has been the practice, therefore, to incorporate additional metal either in the flanges or in the vessel walls adjacent the flanges, or both, the amount of such metal being predetermined so that the degree of deflection, even under the most adverse conditions, will be maintained below the range within which permanent deformation of the walls is likely to occur. The amount of additional metal required for this purpose is substantial and hence has the objection that it adds considerably to the cost of production.

The principal object of the present invention is a pressure vessel wherein provision is made for preventing permanent deformation of the vessel walls without the necessity of incorporating additional metal in the flanges, this object contemplating the connection of the flanges to the walls in such a manner that the distortive forces which act upon the latter are substantially reduced in magnitude.

A further object is to provide a vessel of the type generally described which is simple, economical and compact in design.

The invention is illustrated in the accompanying drawing in which.

Figures 1, 2:
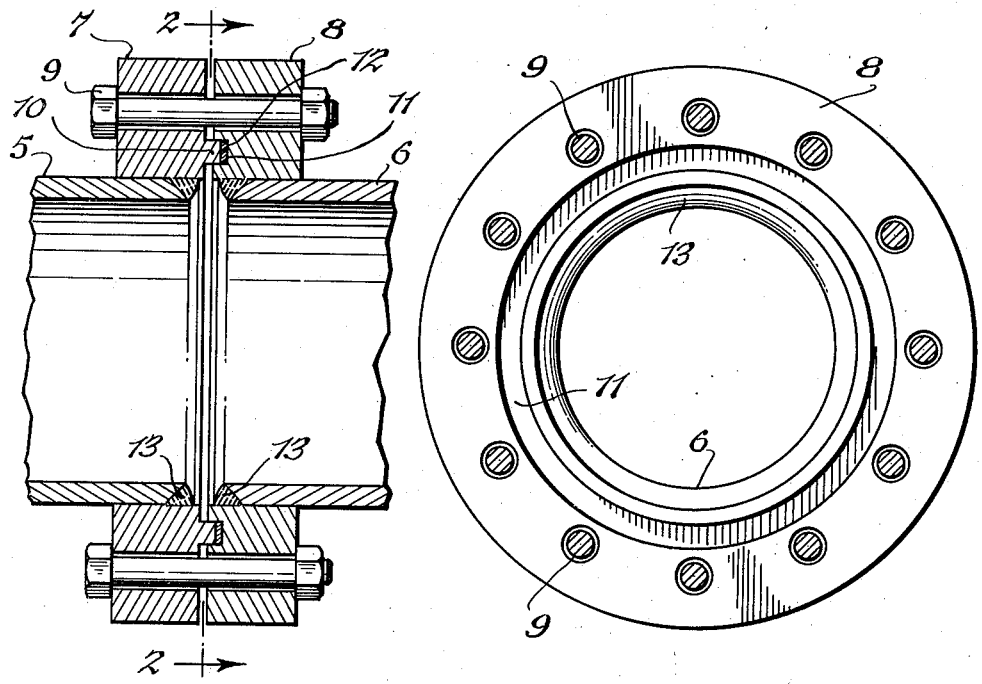
Figure 1 is a sectional view through a pressure vessel embodying the features of the invention.
Figure 2 is a transverse section taken along line 2—2 of Figure 1.

The pressure vessel illustrated is sufficiently indicated for the purpose in view by a showing of companion parts 5 and 6 thereof which are cylindrical in shape, which have terminal portions of a uniform outside diameter and which are formed or provided with co-operating flanges 7 and 8 respectively. The said flanges are secured together in conventional manner by a circular series of bolts 9 which are accommodated in aligned openings and are formed with a rib 10 and groove 11 which co-operate with a packing element 12 to seal the joint thus provided. The flanges, as illustrated, are of the so-called ring type and are generally rectangular in cross section. They fit over the terminal portions of the vessel parts and are preferably secured thereon by annular welds 13. The latter connect predetermined internal zones of the flanges to the end walls of the terminal portions of the vessel parts, the adjacent zones being free with respect to the side walls of the terminal portions. In this connection it is to be understood that the attachments 13 need not necessarily be in the form of welds. They may, if desired, be in the nature of hubs and be formed integrally with the flanges, in which case the vessel parts would, of course, be welded or otherwise secured to them.

Figure 3:
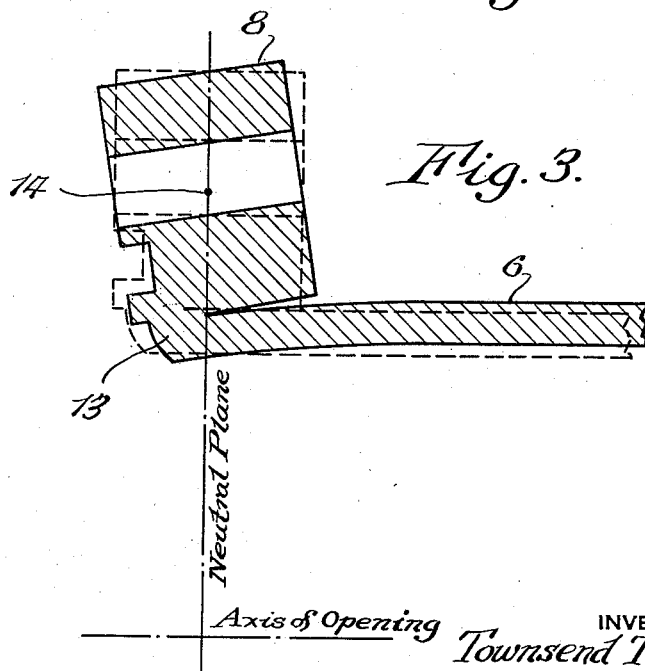
Figure 3 is a diagrammatic sectional view illustrating the manner in which the flange and the vessel wall are deflected under a pressure load.

When the vessel is subjected to pressure loading, the full shearing stresses developed by such loading are applied directly to the welds 13 which are adapted to withstand such stresses as they permit the walls of the vessel to expand, as illustrated in full lines in Figure 3. As this occurs the opposing forces represented by such loading and the pull of the bolts cause the flanges to dish, each of the latter being twisted about a circular axis 14 which, with respect to any radial section through the flange, is located in the vicinity of the center of gravity and which occupies a plane, referred to for convenience as the neutral plane, normal to the axis of the opening delimited by the flange. The dishing of the flange in the manner described is accompanied by an increase in the diameter of the trailing portions (with respect to the direction of deflection) and a decrease in diameter of the leading portions. Hence those portions located at the right side of the neutral plane in Figure 3 are placed under tension while those portions located at the left side thereof are placed under compression, the greater the distance from the neutral plane the greater the tension or compression as the case may be. Referring to Figure 1 it will be noted that those portions of the adjacent sides of the flanges which provide the sealed joint are located inwardly of the bolt holes and serve to hold apart those portions of the adjacent sides located outwardly of the bolt holes. The construction described thus has the advantage that each flange may twist about its neutral axis without resistance to such twisting being offered by the companion flange, the space provided between the adjacent side faces permitting the outer portions of the flanges to move toward one another without impairing the seal provided by those portions of the adjacent side faces within the area defined by the bolt holes. In other words provision is made whereby the flanges may twist without distorting the vessel walls and whereby the seal provided by the flanges will be maintained despite such twist.

In this connection it will be noted that the attachment 13 is located at the left side of the neutral plane and wholly within the zone of compression. On the other hand those portions of the flange which are located within the zone of tension have no connection with the vessel wall and hence do not subject the latter to tensional forces. They merely draw away from the vessel wall, as illustrated, as the flange twists about the axis 14. The normal expansion of the vessel wall is, therefore, not augmented by additional tensional forces as would otherwise be the case if the flange were connected to the said wall at points within the tension zone. Hence the only forces to which the vessel walls are subjected by reason of flange deflection are those of compression. These oppose rather than augment the tensional forces which are created by the pressure of the fluid medium in the vessel and which cause normal expansion of the vessel walls. Thus the latter are permitted to assume a contour which is uninfluenced to any substantial degree by the outward deflection of those portions of the flanges within the tension zones. Excessive distortion or permanent deformation of the vessel walls is, therefore, prevented.

From the foregoing it will be apparent that a measure of freedom is permitted the flanges as distinguishing from the constructions heretofore proposed wherein it has been the practice to minimize their deflection either by increasing their strength or that of the vessel walls, or both, additional metal being employed for this purpose. The vessel described, therefore, has the advantage that the use of such additional metal is rendered unnecessary, thereby effecting a substantial saving in the cost of production.

In the illustrated embodiment of the invention each of the associated parts of the vessel is formed or provided with a flange. It is understood, of course, that this is intended by way of example only as in numerous instances only one of the parts will require such a flange.

I claim as my invention:

1. A joint for companion parts which are adapted to be secured together by bolts, one of said parts terminating in a cylindrical wall portion, an annular external flange fitting over said cylindrical wall portion and to which the other of said parts is adapted to be secured by said bolts, said flange and last named part being formed with aligning holes for said bolts and having abutting side faces which inwardly of said holes cooperate with one another to provide a seal and which outwardly of said holes are held spaced apart by said seal, and an annular fusion weld connecting said flange to the end of said cylindrical wall portion in the line of shearing stress and leaving the major portion of said flange unattached to said cylindrical wall portion, whereby the forces produced by the drawing-up of said bolts and the application of fluid pressure loads tend to distort said flange by setting up a circular axis located in a neutral plane normal to the axis of the flange opening and about which the flange tends to twist in response to said forces to assume a dished shape with attendant development of zones of compression and tension at opposite sides of said neutral plane, the compression zone of the flange being connected by said weld to said cylindrical wall portion and the tension zone drawing away from said cylindrical wall portion as said flange assumes said dished shape, thereby providing for substantial flange deflection while maintaining deflection of said cylindrical wall portion at a magnitude substantially less than that at which permanent distortion occurs.

2. A joint for companion parts which are adapted to be secured together by bolts, one of said parts terminating in a cylindrical portion having side and end walls, an annular external flange fitting over said cylindrical portion and overhanging said end wall and to which the other of said parts is adapted to be secured by said bolts, said flange and last named part being formed with aligning holes for said bolts and having abutting side faces which inwardly of said holes cooperate with one another to provide a seal and which outwardly of said holes are held spaced apart by said seal, and an annular fusion weld connecting the overhanging portion of said flange to said end wall in the line of shearing stress and leaving the major portion of said flange unattached to said side wall, whereby the forces produced by the drawing-up of said bolts and the application of fluid pressure loads tend to distort said flange by setting up a circular axis located in a neutral plane normal to the axis of the flange opening and about which the flange tends to twist in response to said forces to assume a dished shape with attendant development of zones of compression and tension at opposite sides of said neutral plane, the compression zone of the flange including said overhanging portion and the tension zone drawing away from said side wall as said flange assumes said dished shape, thereby providing for substantial flange deflection while maintaining deflection of said side wall at a magnitude substantially less than that at which permanent distortion occurs.

TOWNSEND TINKER.